United States Patent [19]

Fujita et al.

[11] Patent Number: 4,645,412

[45] Date of Patent: Feb. 24, 1987

[54] METHOD OF HANDLING A VEHICLE BODY DURING AN EQUIPPING OPERATION

[75] Inventors: Yoshitada Fujita, Kobe; Sadashi Hanada, Miki; Yoshiaki Yamamoto; Akira Nakabayashi, both of Kobe, all of Japan

[73] Assignee: Kawasaki Jukogyo Kabushiki Kaisha, Hyogo, Japan

[21] Appl. No.: 823,961

[22] Filed: Jan. 29, 1986

Related U.S. Application Data

[63] Continuation of Ser. No. 573,942, Jan. 26, 1984, abandoned.

[30] Foreign Application Priority Data

Feb. 1, 1983 [JP] Japan .................................. 58-15898

[51] Int. Cl.$^4$ ............................................ B66F 7/28
[52] U.S. Cl. ..................................... 414/786; 414/678
[58] Field of Search ................. 104/32 R; 105/261 R, 105/264, 268; 414/359, 360, 364, 371, 372, 678, 779, 786; 254/45

[56] References Cited

U.S. PATENT DOCUMENTS 2,655,115 10/1953 Holdeman et al. ............... 104/32 R
4,295,427 10/1981 Waterman et al. ............ 414/678 X

FOREIGN PATENT DOCUMENTS 679449 8/1979 U.S.S.R. ............................. 414/678

Primary Examiner—Robert J. Spar
Assistant Examiner—Janice Krizek

[57] ABSTRACT

A method of and a system for equipping a vehicle body, particularly a railroad car body, in which the vehicle body is supported for turning movement about a center axis of shafts extending longitudinally substantially through the center of gravity of the vehicle body, and the vehicle body is moved in turning movement to a desired angular position about the center axis of the shafts to perform equipping operations on both the interior and exterior thereof. The system includes a securing device connected to opposite end portions of the vehicle body, a support device for supporting the vehicle body through the securing device and moving same in turning movement about a center axis of shafts extending longitudinally substantially through the center of gravity of the vehicle body, a device for moving the vehicle body in turning movement about the center axis of the shafts, and a fixing device for fixing the vehicle body in place in an arbitrarily selected angular position.

1 Claim, 10 Drawing Figures

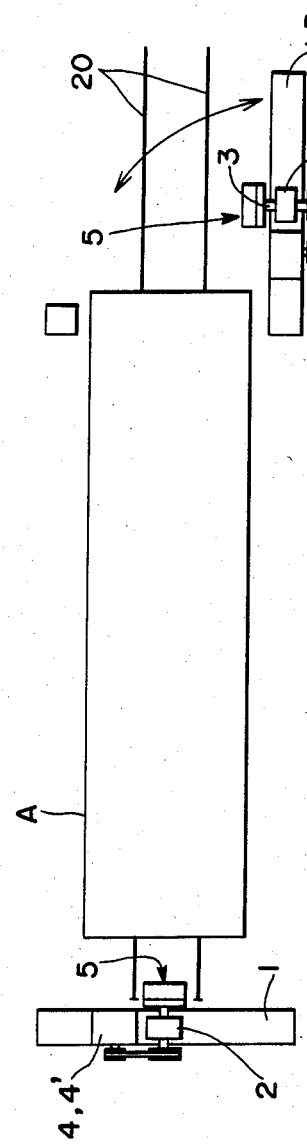
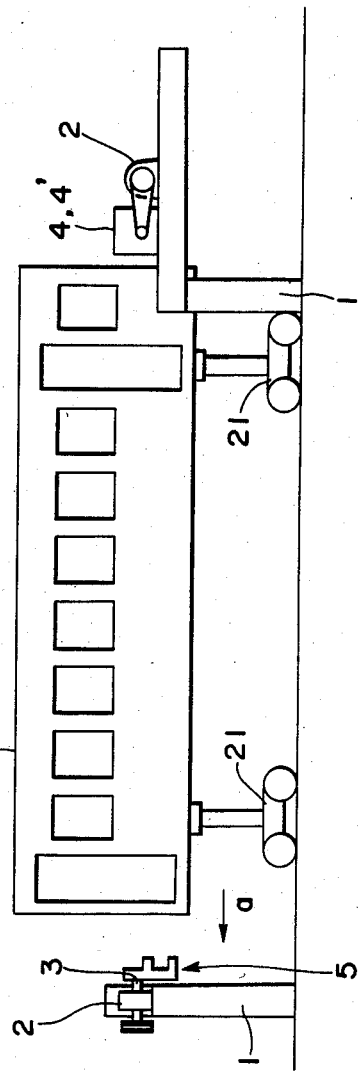
FIG. 1a
FIG. 1b

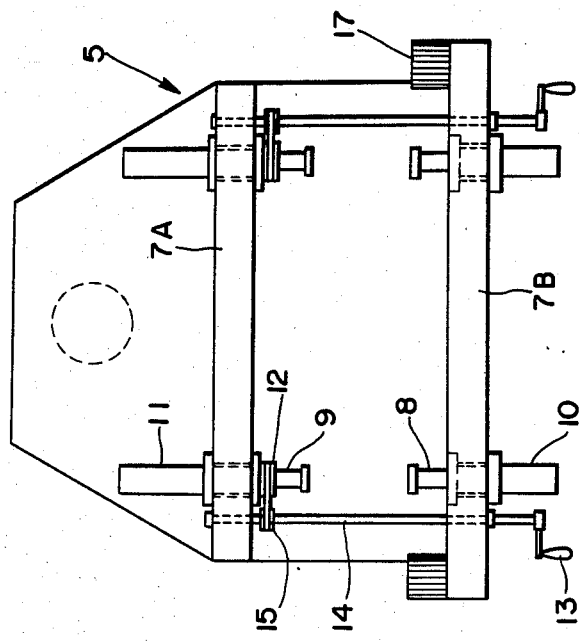
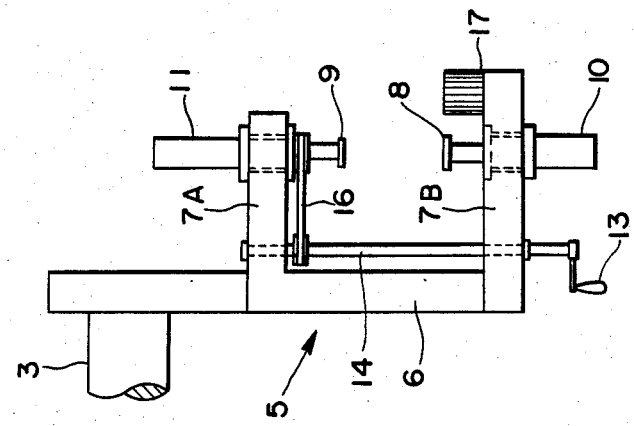

METHOD OF HANDLING A VEHICLE BODY DURING AN EQUIPPING OPERATION

This application is a continuation of application Ser. No. 573,942, filed Jan. 26, 1984, now abandoned.

BACKGROUND OF THE INVENTION

This invention relates to a method of equipping a vehicle body, particularly the body of a railroad car, and a system suitable for carrying such method into practice.

Generally, equipment to be provided to the body of a railroad car and wires and tubes to be mounted therein are mostly attached to the ceiling or below the floor boards. Thus, in operations for equipping a railroad car body, the operators engaged in the operations are forcedly disposed in upwardly facing position. This has given rise to the problem that the railroad car equipping operation is low in operability and efficiency.

As means for solving this problem proposed in the prior art, a reversing system is known which comprises a pair of support rings supported by turning rollers driven by an electric motor for rotation about a horizontal center line for supporting the body of a railroad car, for example, through fixing members by the support rings located at forward and rearward end portions respectively of the car body, so that the car body can be turned over about its center line together with the rings into an upside down position when necessary to enable the operators to perform the operation of equipping the car body in downwardly facing position.

In this type of reversing system, the support rings are each formed of two semicircular halves by dividing each ring into an upper portion and a lower portion to allow a car body hung by a crane to be introduced into a position above the lower semicircular halves of the support rings to which the respective upper semicircular halves are connected, to hold the car body therebetween. The fixing members secure the car body in place in the support rings, and stays are attached to the car body to reinforce same.

The reversing system of the aforesaid construction would suffer the following disadvantages.

(1) When the body to be handled is that of a railroad car, the support rings would be large in size with a diameter of about 5 m, resulting in the reversing system itself becoming large in scale.

(2) Since the four side walls of the car body are supported at their outer surfaces, which form dressed surfaces, by the fixing members, it would be necessary to provide a protection to the outer surfaces of the four side walls.

(3) The car body is supported at the outer surfaces of the four side walls which are relatively low in strength. This would make it necessary to support each ring at least in six positions or a total of twelve positions in two rings, resulting in an increase in the number of fixing members that would be used.

(4) To avoid deformation of the car body, stays would have to be attached to the inner wall surfaces of the car body.

(5) The use of a large number of fixing members for securing the car body to the support rings and a large number of stays attached to the inner surfaces of the car body would interfere with the operations performed by the operators of equipping the car body, resulting in a limitations on the range of operation.

(6) The center of gravity of a car body is generally located in the vicinity of the floor or an underframe. However, the car body is supported by the support rings in such a manner that its geometrical center constitutes the center of its turning movement. This would require a moment of force of high magnitude to drive the car body to turn it over to reverse its position.

(7) It is necessary to use an overhead crane in the operation of mounting the car body in the support rings. This would place limitations on the layout of the plant and make it necessary to use a shed of a large scale to perform the operation of equipping the car body without any trouble.

SUMMARY OF THE INVENTION

This invention has been developed for the purpose of obviating the aforesaid disadvantages of the prior art. Accordingly, the invention has as its object the provision of a method of equipping a car body and a system suitable for carrying the method into practice, wherein the operation of equipping the car body can be performed with improved operability.

The outstanding characteristic of the method of equipping a car body according to the invention is that the car body is supported in such a manner that it can be turned over about a longitudinal center axis extending through the center of gravity of the car body or the vicinity thereof, so that the operations for equipping the interior and exterior of the car body can be performed by turning the car body into different positions as desired.

The system for carrying the method into practice is characterized by comprising securing means connected to opposite end portions of the car body, support means for supporting the car body through the securing means for turning movement about a longitudinal axial line extending through the center of gravity of the car body or the vicinity thereof, and fixing means for fixing the car body in place in an arbitrarily selected position.

By virtue of the aforesaid features of the invention, the operability of car body equipping operations can be improved without using various members which would interfere with performing the operations, and preparatory operations that have hitherto been performed in the prior art before initiating the equipping operations can be greatly reduced in scale or done without.

BRIEF DESCRIPTION OF THE DRAWINGS

FIGS. 1(a) and 1(b) are a plan view and a side view, respectively, of the car body equipping system comprising one embodiment of the invention;

FIGS. 3(a) and 3(b) are a side view and a front view, respectively, of the securing means of the car body equipping system according to the invention, showing one constructional form thereof;

DESCRIPTION OF THE PREFERRED EMBODIMENT

Figure 2A:
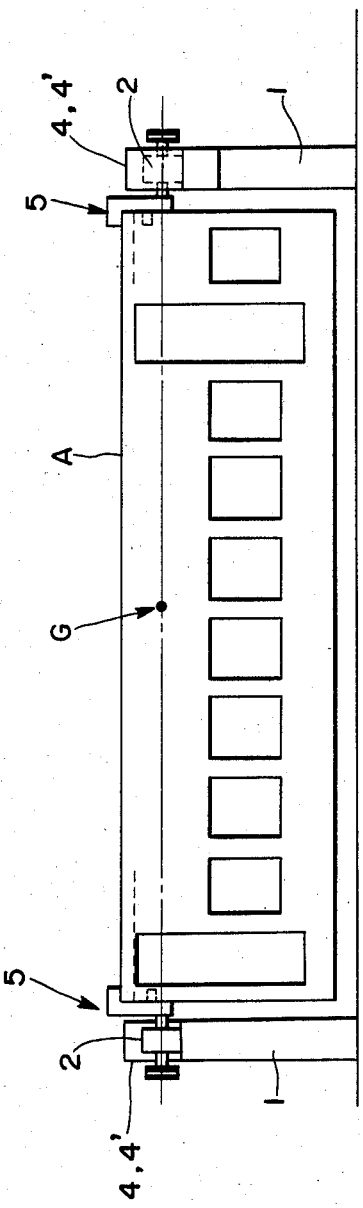
FIGS. 2(a) and 2(b) are a side view and a front view, respectively, of the car body equipping system according to the invention, showing the system in one condition of its use.

A preferred embodiment of the invention will now be described in detail by referring to the accompanying drawings.

In FIGS. 1(a) and 1(b), support means 1 is located in the vicinity of either end of a car body, the two support means 1 and 1 being spaced apart from each other by a distance substantially corresponding to the length of the car body. Each support means 1 which is in the form of a support post or support frame for bearing the total weight of the car body comprises two posts 1A and 1A, and a beam 1B supported by the posts 1A and 1A as shown in FIG. 2(b) which shows support means in the form of a support frame. As shown in FIGS. 1(a) and 1(b), the beam 1B of one of the two support means 1 and 1 can be moved in swinging movement at one end thereof which is supported by one of the posts 1A and 1A to allow the car body supported by trucks to move between the posts 1A and 1A in a direction indicated by an arrow a in FIG. 1(b). The numeral 2 designates a bearing for supporting one of two opposite end portions of the car body for turning movement on each support means 1. The numeral 3 designates a rotary shaft journalled by each bearing 2, and the numeral 4 designates a drive for driving each rotary shaft 3 for rotation to move in turning movement the car body supported by the support means 1 and 1. Each rotary shaft 3 can be stopped during rotation by a brake 4' attached to the drive 4 when the car body has moved to an upside down position or any other suitable position, to thereby hold the car body in the desired position.

Each rotary shaft 3 has securing means 5 for securing the car body thereto. As shown in FIGS. 3(a) and 3(b), each securing means 5 comprises a main body 6 having a pair of jaws 7A and 7B extending axially of the rotary shaft 3 parallel to and spaced apart from each other in a direction perpendicular to the rotary shaft 3. The pair of jaws 7A and 7B each have jacks 10 and 11 provided with displacing members 8 and 9 respectively adapted to move in opposite directions. For the sake of convenience, the jack 10 will be referred to as a lifting jack and the jack 11 as a securing jack. The jacks 10 and 11 may be in the form of hydraulic jacks. Shown in FIGS. 3(a) and 3(b) is locking means for locking the displacing member 9 to the main body 6 comprising a lock nut 12 threadably engaging the displacing member 9 at a threaded portion thereof, a shaft 14 driven for rotation by a handle 13, a pulley 15 and a belt 16 trained over the pulley 15 and lock nut 12. The locking means is capable of readily locking the displacing member 9 of the securing jack 11 to the main body. However, the invention is not limited to the type of locking means shown and described hereinabove, and the movement of the handle may be transmitted through gears or the lock nut 12 may be directly turned. The numeral 17 in FIGS. 3(a) and 3(b) designates positioning pins presently to be described which have the function of positioning the car body supported by the support means 1 and 1.

Figure 4:
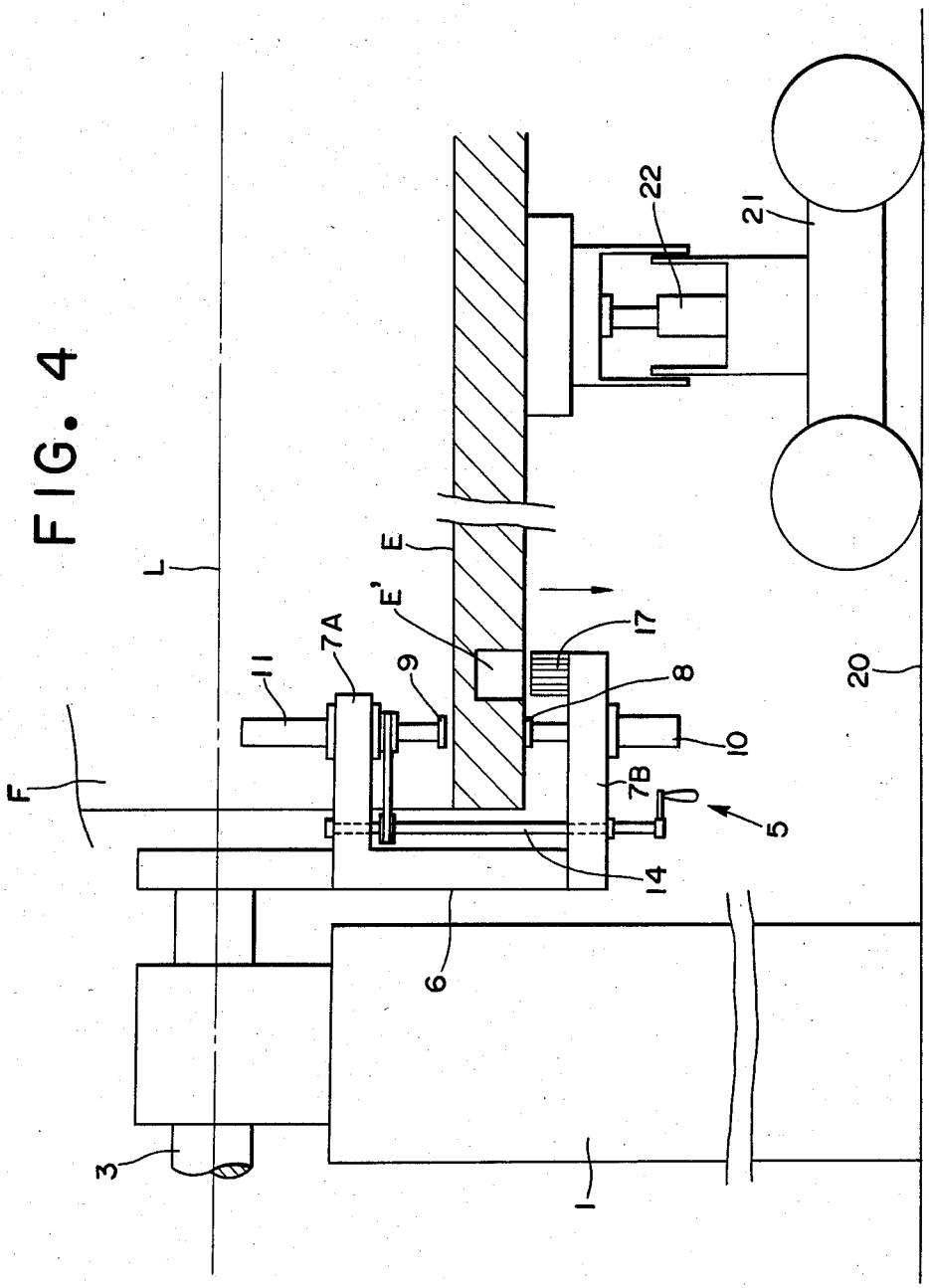
FIG. 4 is a sectional side view of the securing means shown in FIGS. 3(a) and 3(b), showing the manner in which the car body is secured to the support means by the securing means.
Figure 5:
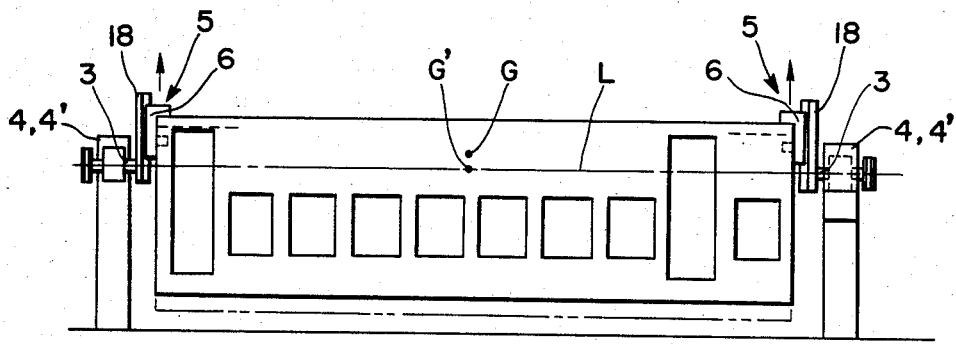
FIG. 5 is a side view of the securing means of another constructional form.

Referring to FIG. 4, the positioning pins 17 on the lower jaw 7B of the securing means 5 are adapted to fit in positioning openings E' formed in a floor board E of the car body at its end portion. As the positioning pins 17 are fitted in the positioning openings E', the position of the center of gravity of the car body has only to coincide, either precisely or substantially, with the position of a center axis L of the rotary shaft 3 when the floor board E has come into contact at its bottom surface with the lower jaw 7B at its top surface. Stated differently, the securing means 5 of the car body equipping system has only to be designed such that the structural relationship between the main body 6 and the lower jaw 7B allows the aforesaid coincidence to be achieved. As the equipping operation progresses, the position of the center of gravity of the car body shows a change. To cope with this phenomenon, a slider 18 is interposed between the rotary shaft 3 and the securing means 5, as shown in FIG. 5. The main body 6 of the securing means 5 may be advantageously threadably connected to the slider 18 for sliding movement, so that the securing means 5 and the rotary shaft 3 can be relatively displaced in a direction perpendicular to the axis of the shaft 3 by threadably moving the slider 18. By this arrangement, when the center of gravity located in a position G at the start of the operation shifts to a position G' as the operation progresses, the center of gravity in the position G' can be brought into coincidence with the center axis L of the shaft 3.

Figure 6A:
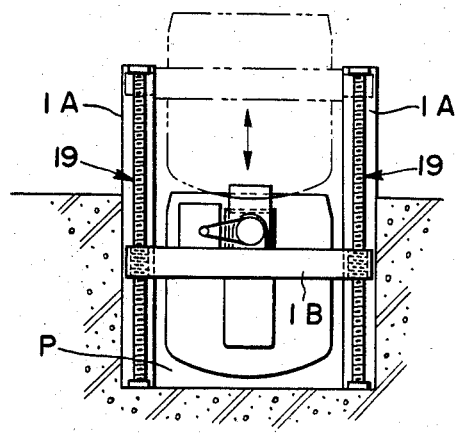
FIGS. 6(a) and 6(b) are front views of the elevatory means of different constructional forms for the car body supported by the support means.
Figure 6B:
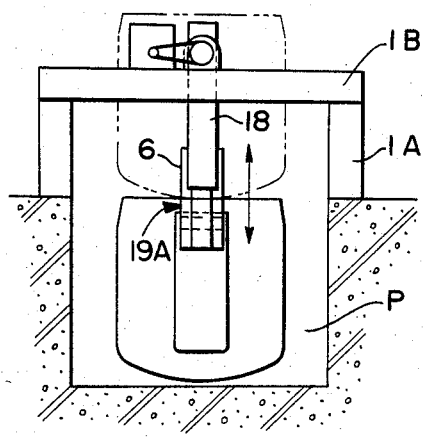

FIG. 6(a) shows a pit P in which the support means 1 and 1 on the opposite ends of the car body are located. As shown, the posts 1A and 1A extend to the bottom of the pit P, and the beam 1B is threadably supported by threaded rods 19 and 19 in the posts 1A and 1A respectively for movement in a vertical direction. By this arrangement, a scaffolding usually used for equipping the car body below the floor boards can be eliminated and operability can be further improved. FIG. 6(b) shows elevatory means 19A attached to the slider 18 without modifying the posts 1A and beam 1B. By this constructional form, the car body can be moved in elevatory movement between the pit P and the ground level and at the same time the function of the slider 18 shown in FIG. 5 can also be performed.

Preparatory operations performed before equipping operations are performed can be performed by using trucks. For example, as shown in FIGS. 1(a) and 1(b), rails 20 may be laid between the two support means 1 and 1 to allow trucks 21 and 21 to run thereon through one support means 1 toward the other support means 1 after the beam 1B of the former is swung to an open position. The trucks 21 and 21 support the car body A thereon to introduce same into an operation station between the two support means 1 and 1. As shown in FIG. 4, each truck 21 is provided with a hydraulic jack 22. The car body A is formed with an opening F for a gangway at either end thereof. The car body is introduced into the operation station by using the trucks 21 and the hydraulic jacks 22 in such a manner that the jaw 7A of the main body 6 of the securing means 5 is located in the opening F, and the weight of the car body is transferred from the hydraulic jacks 22 of the trucks 21 to the lifting jacks 10 of the securing means 5 and the trucks 21 are removed when the positioning pin 17 of the securing means 5 is disposed immediately below the opening E' formed in the floor board E at its end portion which is the most sturdy portion of the car body, thereby terminating preparatory operations.

When no trucks 21 are provided, the height of the car body may be controlled in such a manner that the end portion of the floor board E is inserted between the jaws 7A and 7B of the securing means 5 before the car body is introduced into the operation station. Then, the lifting jacks 10 may be actuated to lift the car body before removing the trucks 21.

Following the aforesaid preparatory operations, the displacing members 8 of the lifting jacks 10 are moved downwardly, and the positioning pin 17 is fitted in the opening E' formed at the end portion of the floor board E so that the weight of the car body may be directly borne by the jaws 7B. Alternatively, the car body may be slightly spaced apart from the jaws 7B by letting the displacing members 8 of the jacks 10 directly bear the weight of the car body, to thereby bring the center of gravity of the car body into coincidence with the center axis L of the rotary shaft 3. When it is difficult to satisfactorily effect adjustments of the vertical position of the center of gravity of the car body by using the jacks 10, the slider 18 shown in FIG. 5 may be used to satisfactorily effect the desired adjustments.

Thereafter, the securing jacks 11 are actuated to bring the displacing members 9 into contact with the top surface of the end portion of the floor board E of the car body, and the car body is locked in position by the locking means.

If the vertical position of the center of gravity of the car body is satisfactorily controlled as described hereinabove, then the car body remains balanced when it is turned. Thus, it is possible to manually turn the car body about the rotary shafts 3 each having a center axis extending through the center of gravity of the car body to any angular position as desired.

When drive means, such as the one using an electric motor or a hydraulic cylinder, is used for turning the car body in place of manually turning same, the need to separately provide means for effecting fine adjustments of the vertical position of the center of gravity of the car body is not so keenly felt. This is because of the facts that the vertical position of the center of gravity of the car body can be obtained beforehand by calculation and that the car body can be turned without much difficulty because of high turning force provided electrically or hydraulically, even if a slight change occurs in the vertical position of the center of gravity of the car body while the equipping operations are being performed.

Figure 2B:
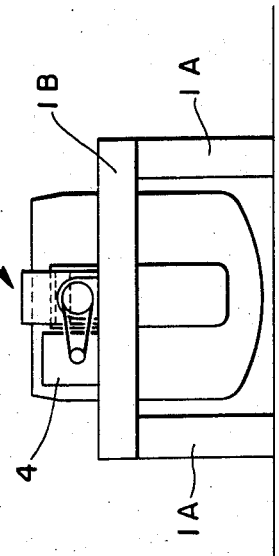

When the equipping operations so dictate, the car body is moved to an upside down position shown in FIGS. 2(a) and 2(b). When the pit P is provided as shown in FIG. 6, the equipping operations can be continued without using a scaffolding on the undersurface of the floor board of the car body which faces upwardly.

Fixing means which may be the brake means 4' attached to the drive means 4 is used for fixing the rotary shafts 3 in place when the car body has moved to the upside down position or any desired tilting position.

Depending on the progress of the equipping operation, the car body may become unbalanced with respect to the center of gravity. For example, the presence of an operator on the car body might upset the balance of the car body. When this happens, not only a moment of force tending to turn the car body about the center axes of the rotary shafts 3 but also a force tending to twist the car body would be produced. Thus, it would be advisable to provide the fixing means for fixing the car body in place by stopping the rotation of the rotary shafts 3 at the opposite ends of the system. However, since the center of gravity of the car body is disposed substantially on the center axes of the rotary shafts 3 serving as the center of turning movement, the moment of force required for turning the car body to an upside down position or any tilting position as desired would be very low in magnitude. Thus, the drive means may be mounted at one end of the system in place of at both ends.

While a preferred embodiment of the invention has been shown and described, it is to be understood that the invention is not limited to the specific form of the embodiment and that many changes and modifications may be made therein within the scope of the invention. For example, the main body 6 of the securing means 5 supported by the rotary shaft 3 is shaped and configured to conform to the form of a common railroad car body. The securing means 5 may be detachably attached to the rotary shaft 3 to use different shapes of securing means for different types of car body. One of the two support means 1 and 1 may be movable to enable the distance between the two support means to be varied to conform to the length of a car body to be handled. In this case, the end can be attained by supporting one support means on a truck.

While the invention has been shown and described as being directed to the operation of equipping a car body or mounting equipment on a car body and providing wires and pipes thereto, it is to be understood that the invention may have application in assembling a body of a vehicle in the form of a parallelepiped.

From the foregoing description, it will be appreciated that the method and system according to the invention described hereinabove can achieve the effect of killing two birds with one stone or provide improvement not only to the operations for equipping a car body but also to the preparatory operations to be performed before the car body equipping operations are performed. The disadvantages of the prior art described in the background of the operation can be obviated as follows:

(1) A force required for turning a car body can be reduced in magnitude because the car body is turned about an axial line extending through the center of gravity of the car body, thereby facilitating turning over the car body.

(2) The car body equipping system according to the invention is simple in construction and small in size, resulting in a reduction in cost.

(3) In the system according to the invention, a car body is secured in place and supported at opposite end portions thereof. Thus, the system does not interfere with the operations of equipping the car body at its internal and external portions and no limitations are placed on the range of operations.

(4) The need to use an overhead crane is eliminated for equipping the car body. This places no great limits on the layout of the plant and allows a small shed to be used.

(5) Since the car body is secured and supported at the opposite ends, the need to provide a special protection to the outside of the side walls which form dressed surfaces is unnecessary.

(6) The operators can perform the equipping operations in downwardly facing position, so that the operations are facilitated while little fatigue is caused to the operators. Elimination of the need to support a part at its underside when it is attached to the car body enables the operators to perform the operations unaided, thereby leading to a reduction in the number of operators performing the equipping operations.

(7) The car body can be readily mounted on the support means for turning movement, so that setting the car body for equipping operations can be performed by a single operator.

What is claimed is:

1. A method of handling a vehicle body during an equipping operation comprising the steps of:

supporting the vehicle body at opposite ends thereof by support means in such a manner that the vehicle body is movable in turning movement about an axis of shafts extending longitudinally substantially through the center of gravity of the vehicle body;

moving the vehicle body in turning movement about the axis of the shafts to any angular position, at which the vehicle body is fixed to perform equipping operations on both the interior and exterior thereof; and, while the vehicle body is supported by said supporting means, adjusting the position of the vehicle body with respect to the shafts so that the center of gravity of the vehicle body remains coincident with the axis of the shafts as the center of gravity of the vehicle body changes during the equipping operation.

* * * * *